United States Patent [19]

Koenig et al.

[11] 4,183,843

[45] Jan. 15, 1980

[54] PHOSPHATE ESTER COATING ON INORGANIC FILLERS FOR POLYESTER RESINS

[75] Inventors: James J. Koenig, Belleville, Ill.; H. Philip Hsieh, Murrysville, Pa.

[73] Assignee: Aluminum Company of America, Pittsburgh, Pa.

[21] Appl. No.: 944,187

[22] Filed: Sep. 20, 1978

[51] Int. Cl.$^2$ ............................ C08K 3/22; C08K 3/32; C08K 9/04

[52] U.S. Cl. ................................. 260/40 R; 428/403; 260/45.7 P

[58] Field of Search ....................... 260/45.7 P, 45.7 R, 260/40 R; 428/403

[56] References Cited

U.S. PATENT DOCUMENTS

| | | | |
|---|---|---|---|
| 2,984,635 | 5/1961 | Harris | 428/403 |
| 3,780,156 | 12/1973 | Cameron | 264/300 |
| 3,909,484 | 9/1975 | Beavon | 260/45.7 P |
| 4,029,514 | 6/1977 | Lange | 428/403 |

OTHER PUBLICATIONS

Bonsignore & Manhart, "Alumina Trihydrate as a Flame Retardant and Smoke Suppressive Filler in Reinforced Polyester Plastics," Aluminum Co. of America (1974) Presented at 29th Annual Conf. of S.P.I. Reinforced Plastics/Composites Institute.

Primary Examiner—Sandra M. Person
Attorney, Agent, or Firm—William J. O'Rourke, Jr.; David W. Brownlee; Glenn E. Klepac

[57] ABSTRACT

An improved process for dispersing inorganic fillers, such as alumina trihydrate, in a polyester resin is disclosed wherein the improvement comprises significantly lowering the viscosity of the polyester-filler dispersion by coating the filler with 0.05 to 1.0 percent, based on the weight of the filler, of a polar phosphate ester surfactant containing acid groups and polar ether groups, prior to adding the filler to the polyester resin.

13 Claims, No Drawings

PHOSPHATE ESTER COATING ON INORGANIC FILLERS FOR POLYESTER RESINS

BACKGROUND OF THE INVENTION

1. Field of the Invention

The present invention relates to the processing of dispersions of inorganic fillers in polyester resins and, more particularly, to a method for reducing the dispersion viscosity of inorganic fillers, including alumina trihydrate, calcium carbonate, titanium dioxide, clay and silica, in polyester resins.

2. Description of the Art

Several inorganic filler materials, including hydrates such as alumina trihydrate ($Al_2O_3 \cdot 3H_2O$), are used in large quantities as flame retardant and smoke suppressive fillers for plastics, particularly for thermosetting polyesters. Such materials resist fire and heat and may contain water of hydration which is slowly released therefrom by dehydration in a fire situation. Increased loading of the fillers into the mixture necessarily increases the flame retardant and smoke suppressive qualities of the plastic material.

It is well known that the presence of alumina trihydrate, as is the case with other inorganic fillers or pigments, has the adverse effect of increasing the dispersion viscosity of the fillers in plastics, particularly polyester resins. Such increased viscosity is proportional to the amount of inorganic filler in the dispersion. Although loading the mixture with more than 50% filler or pigment may be desired, such a mixture exhibits an unworkable viscosity. Therefore, prior to the present invention, the loading had been limited by viscosity.

It is well known to those skilled in the art that the viscosity of many pigment-plastic mixtures can be increased or decreased by applying an appropriate coating to the pigment. For example, U.S. Pat. No. 3,780,156 teaches the addition of up to two percent of an acid modified lubricant, such as esters of ortho phosphoric acid, into a methyl methacrylate-alumina trihydrate mixture to reduce the viscosity of the mixture. However, the prior art is absent a teaching of the coating of the present invention applied to inorganic fillers before the filler is added to a polyester resin to reduce the viscosity of the resulting dispersion.

It is also known that hydrated fillers, such as alumina trihydrate, normally contain weakly bound surface water as well as tightly bound water of hydration. The concurrently filed patent application entitled "Method of Reducing the Viscosity of Polyester-Alumina Trihydrate Dispersions by Slight Dehydration of the Trihydrate" discloses a method of reducing the viscosity by dehydrating the alumina trihydrate to reduce the loss on ignition by 0.2 to 5.0 percent prior to adding the trihydrate to the polyester resin. In a preferred embodiment of the present invention, however, slight dehydration of the alumina trihydrate prior to coating in accordance with the present invention has the effect of reducing the viscosity of a polyester-alumina trihydrate dispersion even more than the reduction achieved through coating alone or through slight dehydration alone.

According to the present invention, the dispersion viscosity of inorganic fillers in polyester resins is reduced by at least 50 percent without affecting the flame retardant and smoke suppressive qualities of the filled polyester material.

SUMMARY OF THE INVENTION

This invention may be summarized as providing an improved process for dispersing an inorganic filler in a polyester resin wherein the improvement comprises lowering the viscosity of the polyester-filler dispersion by coating the filler with from 0.05 to 1.0 percent, based on the weight of the filler, of a polar phosphate ester surfactant, containing acid groups and polar ether groups, prior to adding the filler to the polyester resin.

This invention may be further summarized as providing an inorganic filler selected from the group consisting of alumina trihydrate, calcium carbonate, titanium dioxide, clay and silica, for a low viscosity polyester-filler dispersion, coated with 0.05 to 1.0 percent, based on the weight of the filler, of a polar phosphate ester surfactant, containing acid groups and polar ether groups. This invention further provides a polyester compound comprising a dispersion of an inorganic filler coated with 0.2 to 0.4 percent, based on the weight of the filler, of a polar phosphate ester surfactant, containing acid groups and polar ether groups and a polyester resin.

Among the advantages of the present invention is the provision of lowering the viscosity of a polyester inorganic filler dispersion. It follows that lowering the viscosity of such dispersion increases the workability of the mixture and permits higher loading of the filler with a corresponding increase in fire retardancy and smoke suppression.

Lower viscosity dispersions are particularly advantageous in the fiberglass reinforced plastics industry, such as in the area of polyester spray applications. First, it is easier to mix the major constituents, that is the polyester resin and the coated inorganic filler. Second, lower viscosity dispersions may be more easily sprayed through the tubes, guns, nozzles and other spray apparatus. Also, lower viscosity mixtures more adequately wet reinforcing fibers to reduce the occurrence of stress centers which could otherwise reduce the mechanical properties of the fiberglass reinforced products.

An objective of the present invention is to provide an improved method for treating alumina trihydrate to produce a coated hydrate which when subsequently mixed with a polyester resin produces a dispersion characterized by lower viscosity as compared to the viscosity of a dispersion of the same mixture using untreated alumina trihydrate.

Another objective of this invention is to lower the viscosity of the polyester-trihydrate dispersion without significantly affecting the fire retardancy or smoke suppressive qualities of the final product.

It follows that an advantage of the present invention is to permit higher inorganic filler loading in polyester compounds to increase fire retardancy and smoke suppression.

The above and other objectives and advantages of this invention will be more fully understood and appreciated with reference to the following description.

DESCRIPTION OF THE PREFERRED EMBODIMENTS

Inorganic filler polyester resin dispersions are used primarily in two areas, in polyester spraying applications and in the area of molding compounds, including sheet molding compounds and bulk molding compounds. Spraying, or spray-up as it is commonly called, is a simple and economic molding process for fiberglass reinforced polyester products, such as bathtubs and shower stalls. In such applications, the alumina trihydrate is used in part for flame retardancy and smoke suppression that is typically required to meet the standards of various building codes.

Basically the inorganic filler, such as alumina trihydrate, and the polyester resin are mixed in a drum or the like. The polyester resin may contain additives, such as promoters or thixotropic agents. The mixture is fed through a tube or hose to a spray gun. At the gun, and just prior to discharge therefrom, the filler polyester dispersion is mixed with a catalyst, methyl ethyl ketone peroxide for example. The mixture is then sprayed under a pressure of about 415 kPa (60 psi) onto a waxed mold. Simultaneously, chopped fiberglass strands, approximately 0.635 cm (¼ inch) to 2.54 cm (1 inch) in length, are injected into the spray for concurrent application. A layer of smooth gel coat, acrylics, and cast polyester is typically applied onto the waxed mold surface prior to spraying for cosmetic effect and for impact and corrosion resistance. After the desired thickness is achieved, the sprayed resin may be rolled against the mold to remove entrapped air and to insure uniformity. The sprayed resin gels and cures due to the action of a room temperature catalyst.

For polyester spraying applications, resin, filler and fiberglass are typically used in the following concentrations:

| Material | Concentration |
| --- | --- |
| polyester resin | 50% by weight of resin and filler |
| inorganic filler | 50% by weight of resin and filler |
| fiberglass | 10-20% by weight of resin, filler and fiberglass |

It is desirable to increase the filler loadings not only to increase fire retardancy and smoke suppression but also to decrease the cost of the product by replacing more expensive polyester resin with less expensive filler material. However, as is expected, increasing the amount of the filler or pigment results in increasing the dispersion viscosity in plastics. Increasing the viscosity of the dispersion eventually creates problems, especially in mixing, handling and wetting the fiberglass. Reduced viscosity, on the other hand, promotes dispersion of the filler in the resin which eliminates surface roughness otherwise due to agglomeration of the filler material.

The spray-up polyester resin, such as Koppers B304-60, a typical resin, when used alone, i.e., without the inorganic filler, has a viscosity of about 300 centipoises at 20 rpm and 25° C. as measured on the Brookfield RVT Model Viscometer. As the filler loading is increased, using alumina trihydrate as an example, the alumina trihydrate-polyester dispersion exhibits a significant increase in viscosity as shown in the following representative table:

| Polyester Resin | Alumina Trihydrate* | % Hydrate | Brookfield Viscosity (cps)** |
| --- | --- | --- | --- |
| Koppers B304-60 | none | 0 | 300 |
| | A (8.6 μm)*** | 45 | 1,300 |
| | | 50 | 1,845 |
| | | 60 | 5,120 |
| | | 65 | 15,100 |
| | B (5.1 μm)*** | 45 | 1,530 |
| | | 50 | 2,500 |
| | | 60 | 8,080 |
| | | 65 | 24,750 |
| | C (3.5 μm)*** | 45 | 1,695 |
| | | 50 | 2,505 |
| | | 60 | 12,000 |
| | | 65 | 64,600 |

*from Aluminum Company of America
**at 20 rpm, spindle no. 3 at 25° C.
***particle size median by Sedigraph manufactured by Micromeritics of Atlanta, Georgia Note also the significant increase in dispersion viscosity as the hydrate loading increases above 50%. It will be appreciated by those skilled in the art that as dispersion viscosities approach about 2,000 centipoises at 20 rpm, the dispersions become difficult to mix and handle. It will also be appreciated from the following table that small increases in hydrate loading, in the 50 to 65% range result in significant increases in flame retardancy.

| | Polyester Resins |
| --- | --- |
| % alumina trihydrate | Oxygen Index (% $O_2$) |
| 0 | 18 |
| 30 | 22 |
| 40 | 25 |
| 50 | 28 |
| 60 | 38 |
| 65 | 53 |

Oxygen index is defined as the minimum percent oxygen in an oxygen-nitrogen mixture which will just sustain candle-like burning of the sample.

In accordance with the present invention, the above polyester spraying processes are improved such that the viscosity of the polyester-inorganic filler dispersion is reduced. By this process the filler is coated prior to dispersing with the polyester resin. The inorganic fillers or pigments comprehended by the present invention include alumina trihydrate, calcium carbonate, titanium dioxide, clay and silica. The coatings of the present invention include polar phosphate ester surfactants containing not only acid groups but also polar ether groups. It has been found that the more polar compounds are the more effective coating materials. In order for a liquid medium to effectively disperse an aggregate of solid particles, it must completely wet each particle. The solid-liquid interfacial free energy must be lower than the overall free energy of the effective solid-solid interface. Surface active agents are added to lower the solid-liquid interfacial free energy. In doing this the surface active agents are adsorbed at the interface and statistically oriented so as to give a system of minimum free energy. More polar surface active agents are more strongly adsorbed and provide a lower solid-liquid interfacial free energy, thus enhancing the solid particles dispersion in the liquid medium.

Exemplary coating materials include Triton QS-10, Triton QS-30, Triton QS-44, products of Rohm and Haas; and Wayfos 6TD, Wayfos M10N, Wayfos D10N and Wayfos M60, products of Philip A. Hunt. These products are phosphate esters which are particularly useful because they may contribute slightly to flame retardancy.

The amount of coating material that is to be applied to the inorganic filler is from about 0.05 to 1.0 percent, more preferably between 0.2 and 0.4 percent, and most preferably about 0.25 percent, based on the weight of the filler. The coating is applied by dry coating or wet coating. In dry coating, the filler in the form of a dry powder with a particle size median of less than 15 microns by Sedigraph manufactured by Micromeritics of Atlanta, Ga., is coated with the surfactant before being mixed with the polyester resin. On a commercial scale, dry coating may be achieved by grinding and coating simultaneously. For example, the coating liquid may be injected into a ball mill or a fluid energy mill wherein the filler is being ground. Alternatively, the liquid coating may be injected into a larger sigma mixer or a twin shell blender where coating may be accomplished. In wet coating, the filler and the coating agent are simultaneously introduced to a significant volume of solvent, such as water, that is compatible with the coating agent to form a slurry, such as 30-50% solids. The slurry is filtered and dried at a temperature less than 110° C. for several hours and is subsequently pulverized before using in polyester resins. On a commercial scale, wet coating may be accomplished by adding the surfactant to the slurry containing the filler before filtration and drying in the regular production process for the filler. It has been found that the wet-coated trihydrates gave even lower dispersion viscosity than the dry-coated trihydrates. See the following representative table:

| Method of Coating* | Triton QS-30 Coating Level (%)** | Brookfield Viscosity (cps)*** |
|---|---|---|
| — | — | 1,750 |
| Dry | 0.05 | 1,500 |
| Wet | 0.05 | 650 |

*50% hydrate loading in Koppers B304-60 polyester resin
**coating level based on weight of trihydrate
***at 20 rpm, spindle no. 3 at 25° C.

The method of dry coating, however, is significantly simpler. Both coating methods, dry and wet, are appreciably more effective in reducing the dispersion viscosity than direct addition of the surfactants into the polyester-trihydrate dispersion during mixing. This is attributable to the fact that the precoating (i.e. coating on trihydrate before mixing with polyester) results in better adsorption of the surfactant on trihydrate particle surface. Better adsorption gives greater suspending or dispersion power.

It has also been found that the coating of the present invention may be applied to slightly dehydrated fillers, such as alumina trihydrate, to accomplish an added benefit in dispersion viscosity reduction. Slight dehydration may be accomplished, for example, in a fluid energy mill utilizing hot compressed air. The air temperature must be high enough to thermally decompose the trihydrate. Alternatively, dehydration may be accomplished in a fluid energy mill utilizing superheated steam instead of air, as the grinding fluid.

Dehydration of the inorganic filler, alumina trihydrate for example, is measured in terms of weight loss on ignition between 110° C. and 1100° C. (LOI). The initial actual LOI for alumina trihydrate is found to be from 34.6 to 34.8% although the initial theoretical LOI for alumina trihydrate is 34.6%. The present invention comprehends coating the filler, such as alumina trihydrate, after dehydrating alumina trihydrate only slightly. By slightly, it is meant that the inorganic filler is dehydrated such that the LOI is reduced from about 0.2 to 5.0%. For alumina trihydrate the LOI is reduced from an initial LOI of 34.8% to an LOI of about 29.8 to 34.5%. Preferably, the initial LOI is reduced less than one percent, from 34.8% to about 34.0 to 34.5%.

A person skilled in the art would be able to determine the times and temperatures required to slightly dehydrate the inorganic filler by any of a variety of methods by routine experimentation. It has been found that grinding alumina trihydrate in a fluid energy mill with hot compressed air at an exit temperature of about 150° C. is sufficient to accomplish the requisite dehydration.

By incorporating the slightly dehydrated alumina trihydrate in a polyester resin, the dispersion viscosity is about 20 to 50% of that of comparable dispersions having equal trihydrate concentrations of the same average particle size which had not been slightly dehydrated. But, coating the slightly dehydrated alumina trihydrate in accordance with this invention results in a further significant viscosity reduction.

It is generally known that inorganic filler loadings may be obtainable without experiencing adversely higher viscosities by employing fillers of coarse particle size. However, use of coarse fillers can create other problems, such as particle settling and decreased mechanical properties. Therefore, it is most desirable to employ fillers having an average particle size of less than about 15 microns, and more preferably less than about 10 microns. It is this finer size material which ordinarily causes adversely higher dispersion viscosities as the filler loading is increased. The present invention is directed to the coating of inorganic fillers having an average particle size of less than 15 microns, which, when dispersed in a polyester resin, exhibits a lower viscosity as compared to dispersions in which the minus 15 micron filler is not coated in accordance with the present invention.

The polyester compound of the present invention comprises a product of a dispersion of minus 15 micron in inorganic filler, such as alumina trihydrate, coated with 0.05 to 1.0 percent, based on the weight of the filler, of a polar phosphate ester surfactant containing acid groups and polar ether groups, that is dispersed in a polyester resin. Although the present invention comprehends the use of any polyester resin, exemplary resins include Koppers polyester resin B304-60 and Ashland polyester resin Aropol 8349 T-09. B304-60 polyester resin contains about 45 to 50% monomer (styrene) and a small amount of cabalt naphthenate promoter to effect a rapid cure at room temperature. Aropol 8349 T-09 polyester resin contains about 45% monomer and some promoter.

EXAMPLES

In preparing samples for the spray-up process, proper amounts of polyester resin and an inorganic filler, namely alumina trihydrate, were weighed before mixing in a five-gallon drum by a small air-drive, Gast, three-blade, propeller mixer. Viscosity measurement by the Brookfield RVT model viscometer were made prior to spraying and rolling the dispersion onto a vertically disposed cardboard mold, waxed for easy release of the cured product.

C-330 (P-1957) alumina trihydrate, a product of Aluminum Company of America, having a particle size median of about eight microns and an initial LOI of 34.8% was coated under various conditions and dispersed with a polyester resin, namely B304-60, a product of Koppers Company, with the following results:

| Ex. | Coating | Hydrate Loading (%) | Brookfield Viscosity (cps)* |
|---|---|---|---|
| 1 | None | 50 | 1,590 |
| 2 | None | 55 | 2,560 |
| 3 | 0.25% Triton QS-30 | 50 | 700 |
| 4 | | 55 | 1,010 |
| 5 | | 57 | 1,220 |
| 6 | | 59 | 1,550 |
| 7 | 0.25% Wayfos M10N | 50 | 800 |
| 8 | | 55 | 1,135 |
| 9 | | 57 | 1,800 |

*at 20 rpm, spindle no. 3 at 25° C.

The dispersions described above were fed at a pressure of about 415 kPa (60 psi) to the spray gun of a Ransburg low air, Glass-Craft I.S.D. Spray-Up System, as is commonly used in the industry for hydrate-filled resins. Just prior to ejection, the dispersion was mixed with approximately one percent of a catalyst, such as Lubrizol, a methyl ethyl ketone peroxide sold by Pennwalt Corporation. Simultaneously, with ejection of the dispersion, fiberglass such as Owens Corning 447 grade, chopped into about 2.54 cm (one inch) length strands were sprayed at a pressure of about 800 kPa (115 psi) into the dispersion spray for concurrent application. After spraying the mold to a thickness of about 0.5 cm (0.2 inch), the sprayed resin was rolled against the mold to remove entrapped air and to insure uniformity.

If easy sprayability and good fiberglass wet-out were observed, higher trihydrate loadings were subsequently tested until the maximum loading level was reached. It was found that the uncoated trihydrate in the above example had a maximum workable loading of 55%, whereas, the coated trihydrates were able to reach about 60% loading without causing processing problems.

Curing proceeds in two distinct stages. The first is the formation of a soft gel from the fluid consistency. A resin is gelled when inserting a tongue depressor and raising a portion of the resin out of the container results in a string of resin that snaps rather than stretches elastically. After gelation, the second phase takes place with considerable evolution of heat. The time measured from the moment of catalyst addition to the point of peak temperature is called peak time. After peak time, curing continues, usually at room temperature, for from several hours to several days to arrive at a fully polymerized structure.

A polyester resin system providing a moderate gel time plus rapid cure is generally desirable. Sufficient gel time permits rolling and fiberglass wetting to be accomplished, but excessive gel time or slow cure decreases the production rate. The above examples of dispersions of coated alumina trihydrate, at less than 0.5% coating level, did not affect gel and cure times of the polyester product.

More significant viscosity reductions are exhibited for the dispersions of finer particle size alumina trihydrates in polyester resins as shown in the following table:

| | | Alumina Trihydrate | |
|---|---|---|---|
| Ex. | Coating | LOI | Particle Size Median (μm) | Brookfield Viscosity (cps)* |
|---|---|---|---|---|
| 10 | None | 34.8 | 4.3 | 3,550 |
| 11 | 0.25% Triton QS-30 | 34.8 | 4.3 | 1,700 |
| 12 | None | 34.8 | 5.5 | 1,950 |
| 13 | 0.25% Triton QS-30 | 34.8 | 5.5 | 600 |
| 14 | None | 34.8 | 5.9 | 1,900 |
| 15 | 0.25% Wayfos 6TD | 34.8 | 5.9 | 525 |
| 16 | 0.25% Wayfos M10N | 34.8 | 5.9 | 500 |
| 17 | 0.25% Wayfos D10N | 34.8 | 5.9 | 550 |
| 18 | 0.25% Wayfos M60 | 34.8 | 5.9 | 750 |
| 19 | None | 34.4 | 4.2 | 3,550 |
| 20 | 0.25% Triton QS-10 | 34.4 | 4.2 | 700 |
| 21 | 0.25% Triton QS-30 | 34.4 | 4.2 | 240 |
| 22 | 0.25% Triton QS-44 | 34.4 | 4.2 | 700 |
| 23 | None | 34.8 | 1.0 | 40,250 |
| 24 | 0.2% Triton QS-30 | 34.8 | 1.0 | 6,200 |

*at 20 rpm, spindle no. 3 at 25° C.

The viscosity reductions shown in the above table for alumina trihydrate filler exceed 50% and in the examples range from a reduction of about 80% (Examples 18 and 24) to about 90% (Examples 15 and 16), and actually approach a reduction of 95% (Examples 20 and 21), when applying some coatings on a hydrate that has been slightly dehydrated.

The economic advantage of utilizing the coatings of the present invention is apparent from the small concentrations of the coating materials that are utilized. Additionally, it will be apparent to those skilled in the art that the additives are relatively inexpensive. Similar viscosity reductions with the exemplary surfactants were also observed when using different types of polyester resins, such as Ashland Aropol 8349T-09 resilient polyester resin used in spray-up polyester systems.

To determine that the effective polar phosphate ester coating agents containing acid groups and polar ether groups would reduce the viscosity of dispersions of other inorganic pigments in polyester resins, other pigments were tested. Coating of calcium carbonate, titanium dioxide, clay and silica with such agents prior to adding such pigments to a polyester resin exhibited significant viscosity reductions although not as drastic as in the case of the alumina trihydrate as shown in the following table:

| EFFECT OF TRITON QS-30 COATING ON SUSPENSION VISCOSITY OF VARIOUS PIGMENTS IN POLYESTER* AT 50% LOADING | | |
|---|---|---|
| Pigment | QS-30 Coating Level (%)** | Brookfield Viscosity (cps)*** |
| CaCO$_3$ (Albaglos - trademark of Pfizer Minerals, Pigments & Metals Div.) | — | 17,000 |
| " | 0.5 | 12,600 |
| CaCO$_3$ (Camel-Wite - trademark of Harry T. Campbell & Sons Corp.) | — | 2,850 |
| " | 0.5 | 2,300 |
| TiO$_2$ (Unitane - trademark of American Cyanimide Company) | — | 5,100 |
| " | 0.5 | 3,300 |
| Clay (Hydrafine - trademark of J.M. | — | 31,500 |

-continued

EFFECT OF TRITON QS-30 COATING
ON SUSPENSION VISCOSITY OF VARIOUS
PIGMENTS IN POLYESTER* AT 50% LOADING

| Pigment | QS-30 Coating Level (%)** | Brookfield Viscosity (cps)*** |
|---|---|---|
| Huber Corp.) | | |
| " | 0.5 | 12,500 |
| Silica (Hi-Sil 404 - trademark of PPG Industries, Inc.) | — | 27,000 |
| " | 0.5 | 13,000 |
| " | 1.0 | 9,000 |

*Koppers B304-60
**Based on weight of pigment
***At 20 rpm, spindle no. 3 at 25° C.

Spray-up polyester resins containing alumina trihydrate coated with phosphate esters, as set forth in the examples, were tested for gel and cure characteristics. Samples of the cured polyester sheets were also tested for mechanical properties and flame retardancy as compared to uncoated trihydrates. There was no detrimental effect in terms of gel and cure characteristics, mechanical strength or flame retardancy provided the coating level remained less than one percent based on the weight of the inorganic filler material.

Whereas, the particular embodiments of this invention have been described above for purposes of illustration, it will be apparent to those skilled in the art that numerous variations of the details may be made without departing from the invention.

What is claimed is:

1. A process for dispersing an inorganic filler in a polyester resin comprising:
   lowering the viscosity of a polyester-filler dispersion, by coating the filler with 0.05 to 1.0 percent, based on the weight of the filler, of a polar phosphate ester containing acid groups and polar ether groups; and
   after coating the filler, dispersing 40 to 65 percent of the filler, based on the total weight of resin and filler, with a polyester resin.

2. A method as set forth in claim 1 wherein the filler is coated with 0.2 to 0.4 percent of a polar phosphate ester containing acid groups and polar ether groups.

3. A method as set forth in claim 1 wherein the inorganic filler is selected from the group consisting of alumina trihydrate, calcium carbonate, titanium dioxide, clay and silica.

4. A method as set forth in claim 1 wherein the average particle size of the inorganic filler is less than 15 microns.

5. A method as set forth in claim 1 wherein 50 to 60 percent of the coated filler is dispersed with the polyester resin.

6. A process for dispersing alumina trihydrate having an average particle size less than 15 microns in a polyester resin comprising:
   lowering the viscosity of a polyester-trihydrate dispersion by at least 50 percent by coating alumina trihydrate with 0.2 to 0.4 percent, based on the weight of the trihydrate, of a polar phosphate ester containing acid groups and polar ether groups; and
   after coating the trihydrate dispersing 50 to 60 percent of the trihydrate, based on the total weight of polyester resin and alumina trihydrate, with the polyester resin.

7. A method as set forth in claim 6 wherein the alumina trihydrate is dehydrated to reduce the initial loss on ignition thereof by from 0.2 to 5.0 percent before coating the alumina trinydrate.

8. A method as set forth in claim 7 wherein the alumina trihydrate is dehydrated to reduce the loss on ignition in a range of from about 34.0 to 34.5 percent.

9. A coated alumina trihydrate composition suitable for low viscosity dispersion with 40 to 65 percent polyester resin based on the total weight of the resin and the trihydrate, consisting essentially of alumina trihydrate having an average particle size less than 15 microns coated with 0.05 to 1.0 percent, based on the weight of the trihydrate, of a polar phosphate ester containing acid groups and polar ether groups.

10. A coated alumina trihydrate composition as set forth in claim 9 wherein the trihydrate is coated with 0.2 to 0.4 percent of the polar phosphate ester.

11. A thermosetting polyester compound comprising a polyester resin, a curing catalyst and about 40 to 65 percent alumina trihydrate, based on the total weight of the resin and the trihydrate, said alumina trihydrate coated with 0.05 to 1.0 percent, based on the weight of the trihydrate, of a polar phosphate ester containing acid groups and polar ether groups.

12. A polyester compound as set forth in claim 11 further comprising 10 to 20 percent reinforcing fiberglass strands, based on the total weight of the resin and the trihydrate.

13. A polyester compound as set forth in claim 11 wherein the trihydrate is coated with 0.2 to 0.4 percent of the polar phosphate ester.

* * * * *